(12) United States Patent
Kumar et al.

(10) Patent No.: US 11,122,475 B2
(45) Date of Patent: Sep. 14, 2021

(54) HANDOVER CRITERIA FOR WIRELESS NETWORKS

(71) Applicant: QUALCOMM Incorporated, San Diego, CA (US)

(72) Inventors: Akash Kumar, Hyderabad (IN); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/139,838

(22) Filed: Sep. 24, 2018

(65) Prior Publication Data
US 2020/0100151 A1 Mar. 26, 2020

(51) Int. Cl.
| | |
|---|---|
| H04B 7/0413 | (2017.01) |
| H04B 7/04 | (2017.01) |
| H04B 7/0452 | (2017.01) |
| H04L 5/00 | (2006.01) |
| H04W 36/00 | (2009.01) |
| H04W 36/30 | (2009.01) |

(52) U.S. Cl.
CPC ... *H04W 36/0094* (2013.01); *H04W 36/0058* (2018.08); *H04W 36/30* (2013.01)

(58) Field of Classification Search
CPC ............. H04W 36/00; H04W 36/0061; H04W 36/0083; H04W 24/10; H04W 36/245
USPC .......................................... 370/331; 455/436
See application file for complete search history.

(56) References Cited

U.S. PATENT DOCUMENTS

| | | | |
|---|---|---|---|
| 8,805,372 B2* | 8/2014 | Cook .............. | H04W 36/00835 455/436 |
| 2010/0240371 A1* | 9/2010 | Cook .............. | H04W 36/00835 455/436 |
| 2010/0322176 A1* | 12/2010 | Chen ..................... | H04L 5/0057 370/329 |

(Continued)

FOREIGN PATENT DOCUMENTS

WO    WO-2018106429 A1    6/2018

OTHER PUBLICATIONS

Azar., "Idle Mode: How UE reselects a Cell using R-criteria (Reselection and Ranking Criteria)", Retrieved from the Internet: http://www.techtrained.com/r-criteria/ [retrieved on Jul. 26, 29018], pp. 1-6.

(Continued)

*Primary Examiner* — Asad M Nawaz
*Assistant Examiner* — Jason A Harley
(74) *Attorney, Agent, or Firm* — Patterson + Sheridan, LLP

(57) ABSTRACT

Handover criteria for wireless networks are provided. A base station (BS) transmits, to a user equipment (UE), a configuration for at least one measurement event to be used for a handover of the UE from a source cell to one of a set of neighbor cells, wherein the configuration includes at least a configured rank criterion for triggering a measurement report in response to the measurement event. The BS receives, from the UE, the measurement report based on the configuration, the measurement report at least including a measured rank value for one or more reported cells in the set. The BS selects a target cell from the reported cells for the handover based at least on the received measured rank values, and transmits a handover command to the UE for the handover to the selected target.

30 Claims, 12 Drawing Sheets

(56) References Cited

U.S. PATENT DOCUMENTS

| | | | |
|---|---|---|---|
| 2011/0142147 A1* | 6/2011 | Chen | H04B 7/0417 375/260 |
| 2011/0268028 A1* | 11/2011 | Stern-Berkowitz | H04L 5/0048 370/328 |
| 2013/0143578 A1* | 6/2013 | Lekutai | H04W 36/00837 455/444 |
| 2013/0225188 A1 | 8/2013 | Seo et al. | |
| 2013/0252660 A1* | 9/2013 | Bach | H04W 52/0206 455/525 |
| 2013/0286955 A1* | 10/2013 | Morinaga | H04L 5/00 370/329 |
| 2014/0140313 A1* | 5/2014 | Liu | H04L 1/0002 370/329 |
| 2014/0293944 A1* | 10/2014 | Kim | H04L 5/0023 370/329 |
| 2015/0036663 A1* | 2/2015 | Kilpatrick, II | H04W 36/245 370/332 |
| 2017/0150410 A1* | 5/2017 | Yang | H04W 36/0083 |
| 2017/0223744 A1* | 8/2017 | Qian | H04W 74/0833 |
| 2017/0359200 A1 | 12/2017 | Almalfouh et al. | |
| 2018/0048413 A1 | 2/2018 | Liu et al. | |

OTHER PUBLICATIONS

La-Roque., et al., "A New Cell Selection and Handover Approach in Heterogeneous LTE Networks: Additional Criteria Based on Capacity Estimation and User Speed", AICT 2015 : The Eleventh Advanced International Conference on Telecommunications, 2015, pp. 57-65.

International Search Report and Written Opinion—PCT/US2019/051736—ISA/EPO—dated Dec. 6, 2019.

Seungjune Y., et al., "3.7 UE Capability Transfer", In: "ProQuest Ebook Central", Sep. 25, 2012 (Sep. 25, 2012), pp. 65-75, John Wiley & Sons, Incorporated, XP055641103, ISBN: 978-1-118-18855-2, Paragraph 3.8.1, Paragraph 3.9.

* cited by examiner

```
DL-DCCH-Message ::= {
    message: c1: rrcConnectionReconfiguration:
RRCConnectionReconfiguration ::= {
        rrc-TransactionIdentifier: 0
        criticalExtensions: c1: rrcConnectionReconfiguration-
r15:
            RRCConnectionReconfiguration-r15-IEs ::= {
        <>
                            }
                        }
            reportConfigToAddModList: ReportConfigToAddModList ::= {
              ReportConfigToAddMod ::= {
                reportConfigId: 7
                reportConfig: reportConfigEUTRA: ReportConfigEUTRA ::= {
                  triggerType: event: event ::= {
                    eventId: eventR5: eventR5 ::= {
```

[a5-Threshold1: threshold-RSRP: 31] — 710

[a5-Threshold2: threshold-RSRP: 37] — 720

}

[hysteresis: 2] — 730

```
                  timeToTrigger: 11 (ms640)
                }
                triggerQuantity: 0 (rsrp)
                reportQuantity: 0 (sameAsTriggerQuantity)
                maxReportCells: 4
                reportInterval: 1 (ms240)
                reportAmount: 7 (infinity)
                reportconfigeutra-ext1: reportconfigeutra-ext1 ::= {
                   reportAddNeighMeas-r10: 0 (setup)
                }
              }
```

FIG. 7

```
UL-DCCH-Message ::= {
    message: c1: measurementReport: MeasurementReport ::= {
        criticalExtensions: c1: measurementReport-r15:
MeasurementReport-r15-IEs ::= {
            measResults: MeasResults ::= {
                measId: 2
                measResultPCell: measResultPCell ::= {
                    rsrpResult: 19     ⎤ 810
                    rsrqResult: 6
                }
                measResultNeighCells: measResultListEUTRA:
MeasResultListEUTRA ::= {
                    MeasResultEUTRA ::= {
                        physCellId: 284
                        measResult: measResult ::= {
                            rsrpResult: 20    ⎤ 820
                            rsrqResult: 17
                        }
                    }
                    MeasResultEUTRA ::= {
                        physCellId: 288
                        measResult: measResult ::= {
                            rsrpResult: 17    ⎤ 830
                            rsrqResult: 8
                        }
                    }
                }
            }
```

```
DL-DCCH-Message ::= {
    message: c1: rrcConnectionReconfiguration:
RRCConnectionReconfiguration ::= {
        rrc-TransactionIdentifier: 0
        criticalExtensions: c1: rrcConnectionReconfiguration-r15:
            RRCConnectionReconfiguration-r15-IEs ::= {
    <>
                                }
                        }
        reportConfigToAddModList: ReportConfigToAddModList ::= {
          ReportConfigToAddMod ::= {
            reportConfigId: 7
            reportConfig: reportConfigEUTRA: ReportConfigEUTRA ::= {
              triggerType: event: event ::= {
                eventId: eventR5: eventR5 ::= {
```

- 710 a5-Threshold1: threshold-RSRP: 31

- 720 a5-Threshold2: threshold-RSRP: 37

- 1110 rank threshold : 8

}

- 730 hysteresis: 2

- 1120 rank hysteresis : 4

```
                timeToTrigger: 11 (ms640)
              }
              triggerQuantity: 0 (rsrp)
              reportQuantity: 0 (sameAsTriggerQuantity)
              maxReportCells: 4
              reportInterval: 1 (ms240)
              reportAmount: 7 (infinity)
              reportconfigeutra-ext1: reportconfigeutra-ext1 ::= {
                reportAddNeighMeas-r10: 0 (setup)
              }
            }
```

```
UL-DCCH-Message ::= {
    message: c1: measurementReport: MeasurementReport ::= {
        criticalExtensions: c1: measurementReport-r15:
MeasurementReport-r15-IEs ::= {
            measResults: MeasResults ::= {
                measId: 2
                measResultPCell: measResultPCell ::= {
                    rsrpResult: 19    ⎤ ⎯ 810
                    rsrqResult: 6     ⎦ rank : 6          ⎯ 1210
                }
                measResultNeighCells: measResultListEUTRA:
MeasResultListEUTRA ::= {
                    MeasResultEUTRA ::= {
                        physCellId: 284
                        measResult: measResult ::= {
                            rsrpResult: 20   ⎤ ⎯ 820
                            rsrqResult: 17   ⎦ rank : 4         ⎯ 1220
                        }
                    }
                    MeasResultEUTRA ::= {
                        physCellId: 288
                        measResult: measResult ::= {
                            rsrpResult: 17   ⎤ ⎯ 830
                            rsrqResult: 8    ⎦ rank : 8         ⎯ 1230
                        }
                    }
                }
            }
```

FIG. 12

HANDOVER CRITERIA FOR WIRELESS NETWORKS

INTRODUCTION

Field of the Disclosure

Aspects of the present disclosure relate to wireless communications, and more particularly, to techniques for selecting an optimal target cell for handing over a User Equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a Base Station (BS). The method generally includes transmitting, to a User Equipment (UE), a configuration for at least one measurement event to be used for a handover of the UE from a source cell to one of a set of neighbor cells, wherein the configuration includes at least a configured rank criterion for triggering a measurement report in response to the measurement event; receiving, from the UE, the measurement report based on the configuration, the measurement report at least including a measured rank value for one or more reported cells in the set; selecting a target cell from the reported cells for the handover based at least on the received measured rank values; and transmitting a handover command to the UE for the handover to the selected target cell.

Certain aspects of the present disclosure provide a method for wireless communication by a User Equipment (UE). The method generally includes receiving a configuration for at least one measurement event to be used for a handover of the UE from a source cell to one of a set of neighbor cells, wherein the configuration includes at least a configured rank criterion for triggering a measurement report by the UE in response to the measurement event; detecting that the rank criterion has been satisfied; transmitting the measurement report in response to the detection, the measurement report at least including a measured rank value for the one or more reported cells in the set; receiving a handover command for the handover of the UE to a target cell selected from the reported cells for the handover based at least on the reported measured rank values; and initiating the handover of the UE to the target cell based on the handover command.

Certain aspects of the present disclosure provide an apparatus for wireless communication by a Base Station (BS). The apparatus generally includes means for transmitting, to a User Equipment (UE), a configuration for at least one measurement event to be used for a handover of the UE from a source cell to one of a set of neighbor cells, wherein the configuration includes at least a configured rank criterion for triggering a measurement report in response to the measurement event; means for receiving, from the UE, the measurement report based on the configuration, the measurement report at least including a measured rank value for one or more reported cells in the set; means for selecting a target cell from the reported cells for the handover based at least on the received measured rank values; and means for transmitting a handover command to the UE for the handover to the selected target cell.

Certain aspects of the present disclosure provide an apparatus for wireless communication by a UE. The apparatus generally includes means for receiving a configuration for at least one measurement event to be used for a handover of the UE from a source cell to one of a set of neighbor cells, wherein the configuration includes at least a configured rank criterion for triggering a measurement report by the UE in response to the measurement event; means for detecting that the rank criterion has been satisfied; transmitting the measurement report in response to the detection, the measurement report at least including a measured rank value for the one or more reported cells in the set; means for receiving a handover command for the handover of the UE to a target cell selected from the reported cells for the handover based at least on the reported measured rank values; and means for initiating the handover of the UE to the target cell based on the handover command.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example measurement object configuring the measurement event A5 for the UE.

FIG. 8 illustrates an example UE measurement report.

FIG. 11 illustrates an example measurement object adding a rank based criterion to the measurement object of FIG. 7, in accordance with certain aspects of the present disclosure.

FIG. 12 illustrates an example measurement report adding measured rank reports to the measurement report of FIG. 8, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
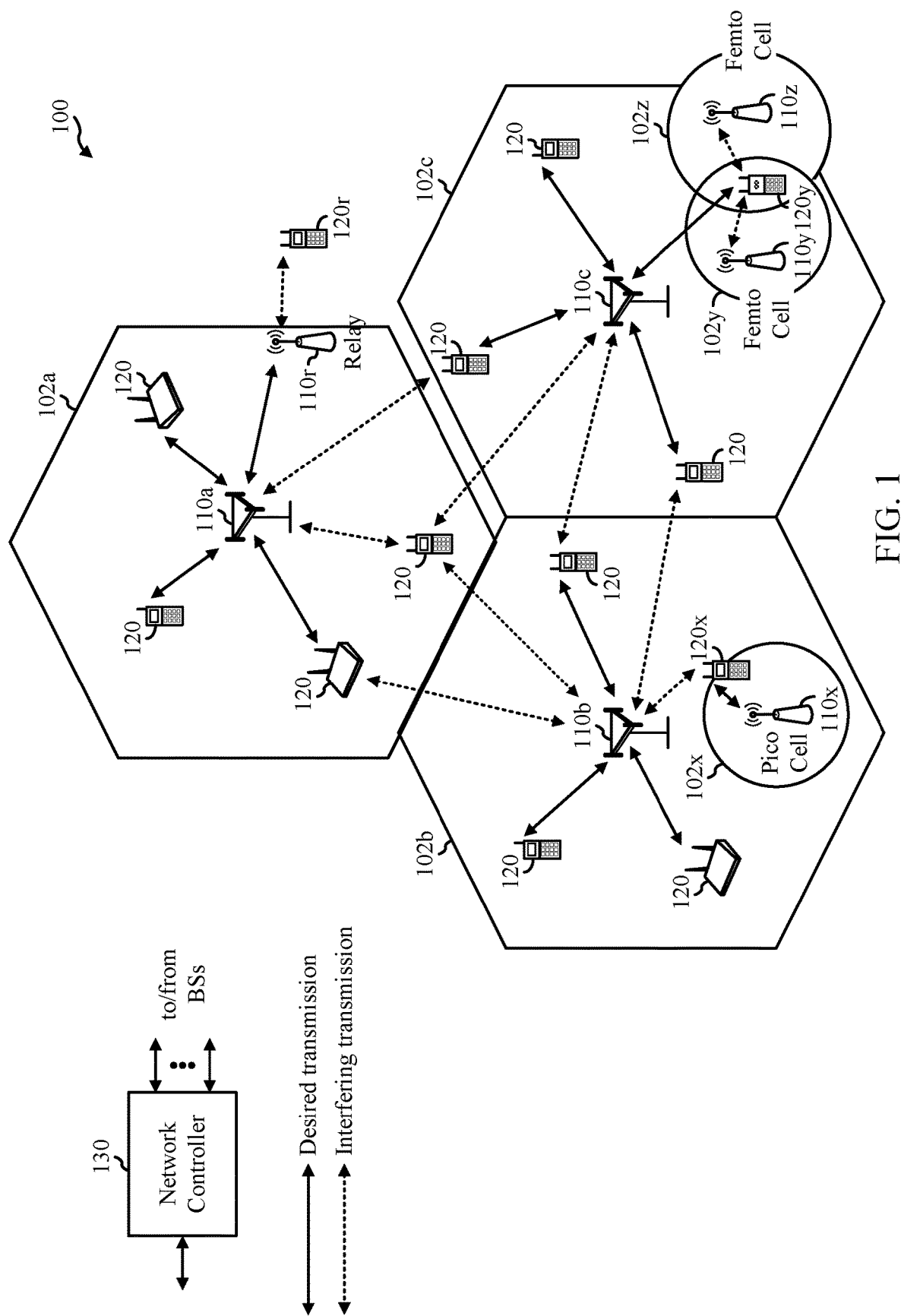
FIG. 1 is a block diagram conceptually illustrating an example telecommunications system, in accordance with certain aspects of the present disclosure.

In current systems, the handover decision for handing over a UE between cells is based only on signal strength parameters (e.g., RSRP and/or RSRQ using which the network decides which neighbor cell is the most suitable for a UE handover. The signal strength based criterion for UE handover is suitable for a UE in an idle mode, for example, when the UE is only monitoring and receiving pages from the network and not actively receiving or transmitting data. However, the signal strength based handover criterion is not optimal for a UE in a connected state especially when performing data intensive operations including active data streams on the downlink and/or uplink. In some cases, even if a neighbor cell satisfies the signal strength criterion defined by the network, the neighbor cell may not be optimal for the UE handover. For example, the target cell may support a lower rank than the source cell, the target frequency on the target cell may support a lower rank than the source frequency of the source cell (e.g., due to device capability). Further, in intra-frequency handover, even when the frequency of the source and the target cell are the same, the rank in the target cell may be lower due to channel characteristics of the target cell. The lower rank in the target cell may affect the throughput of the UE. While this currently defined handover criteria may be sufficient for certain LTE systems, it is not suitable for $5^{th}$ Generation (5G) New Radio (NR) systems such as massive Multiple Input Multiple Output (massive MIMO) based systems.

Aspects of the present disclosure describe techniques for handover of UEs (especially in connected state) based at least on a rank based criterion. In an aspect, the rank based criterion may be in addition to or alternative to the current signal strength based criterion. The techniques described herein are applicable to 5G NR systems such as massive MIMO based systems both for 6 GHz and mmW mode. These techniques are also applicable to LTE systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
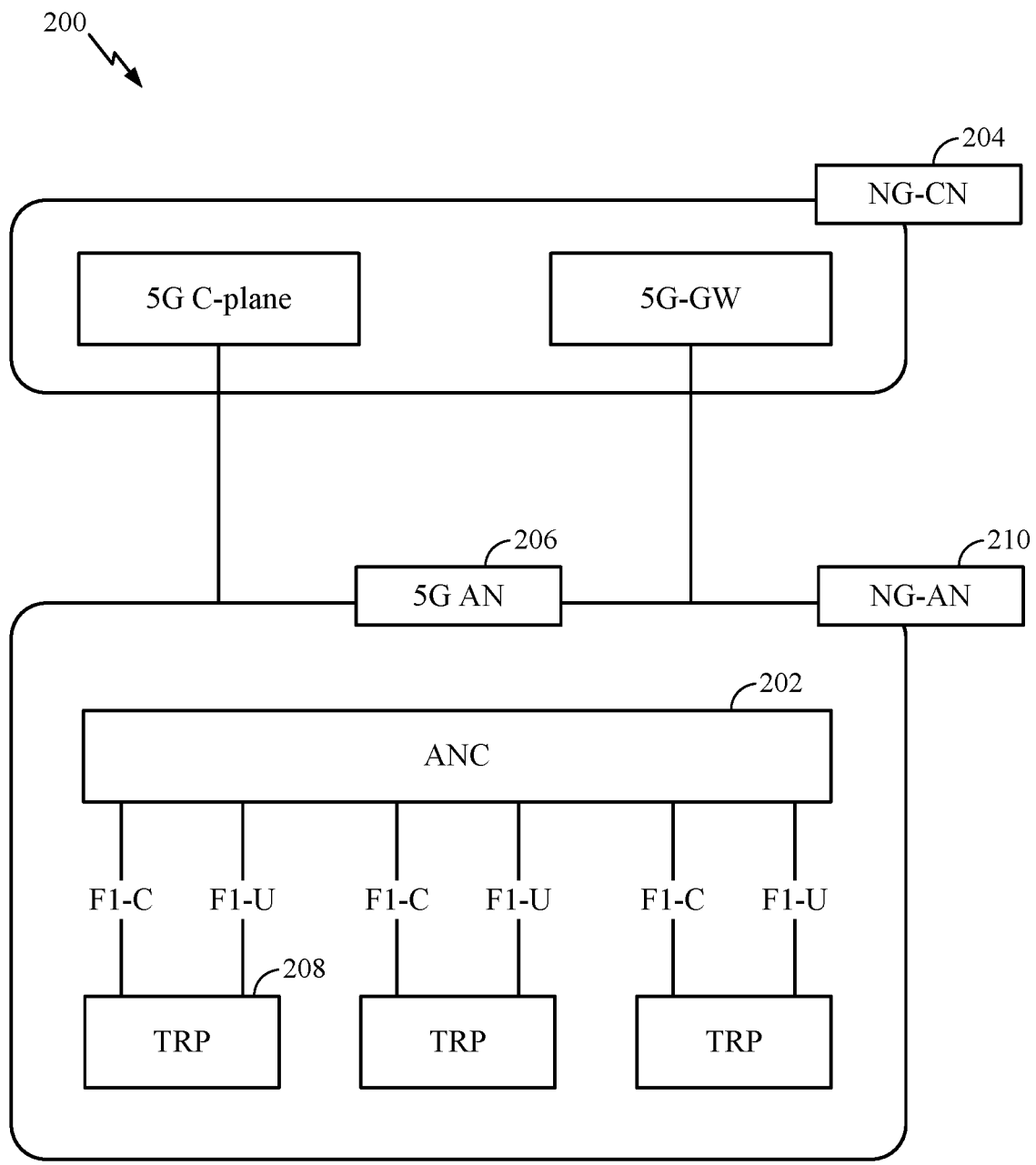
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
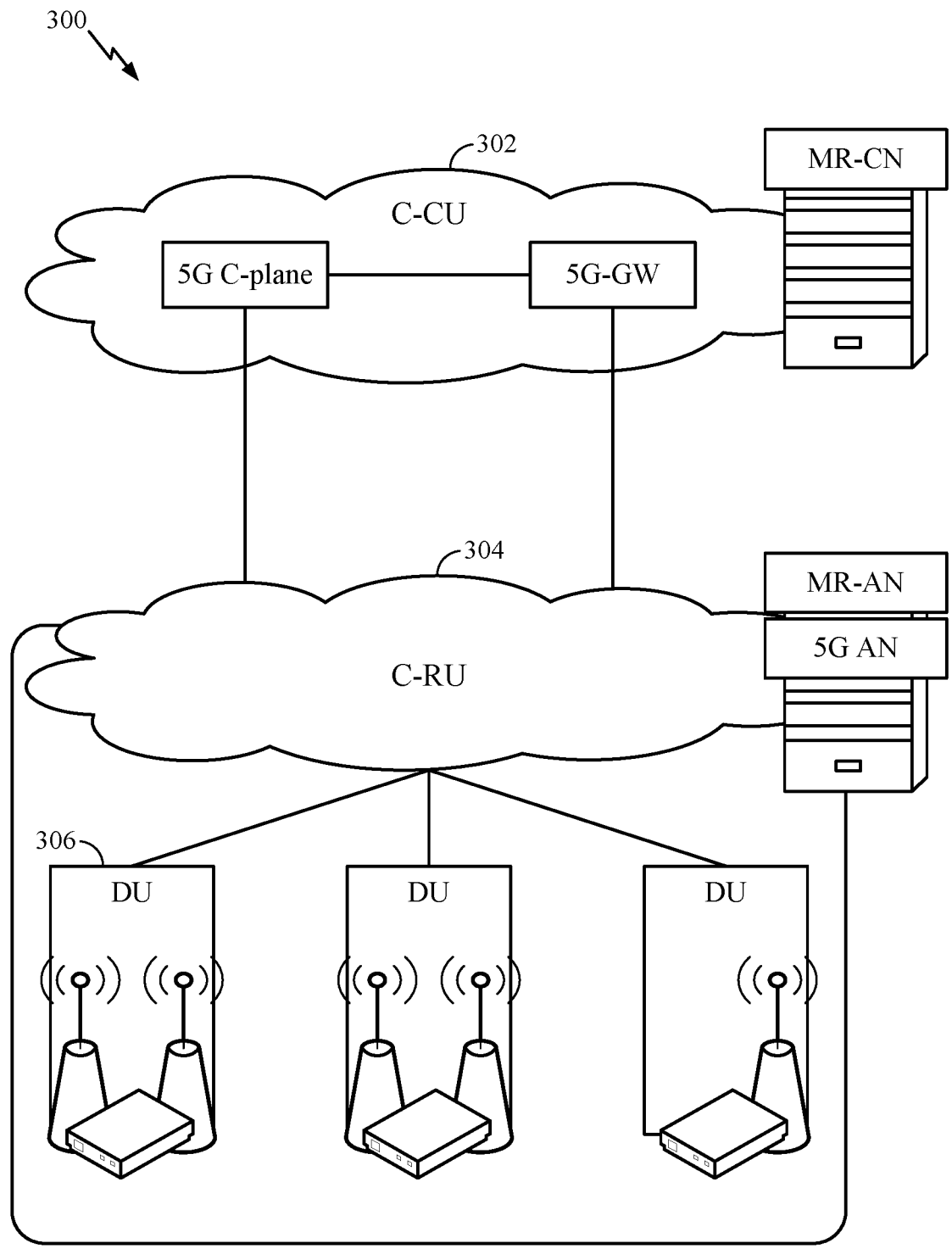
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
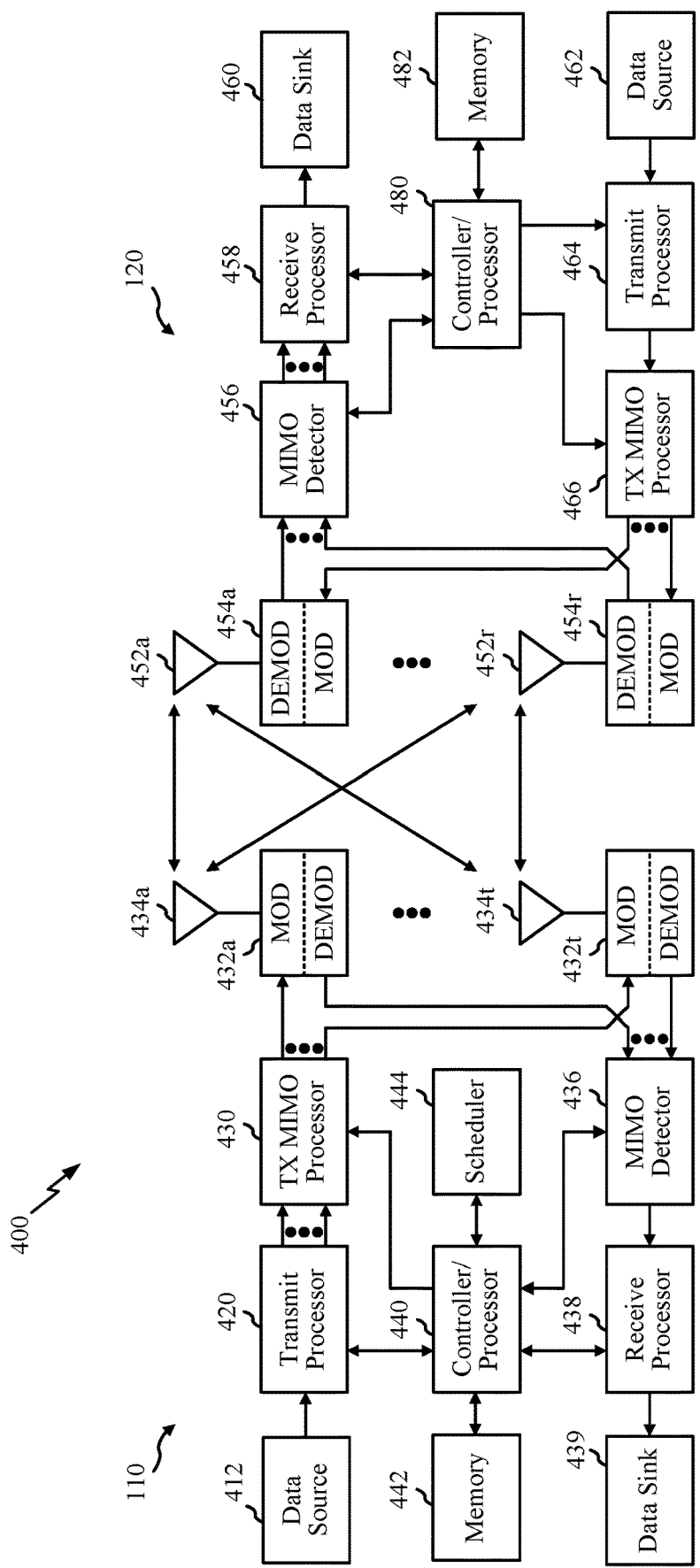
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
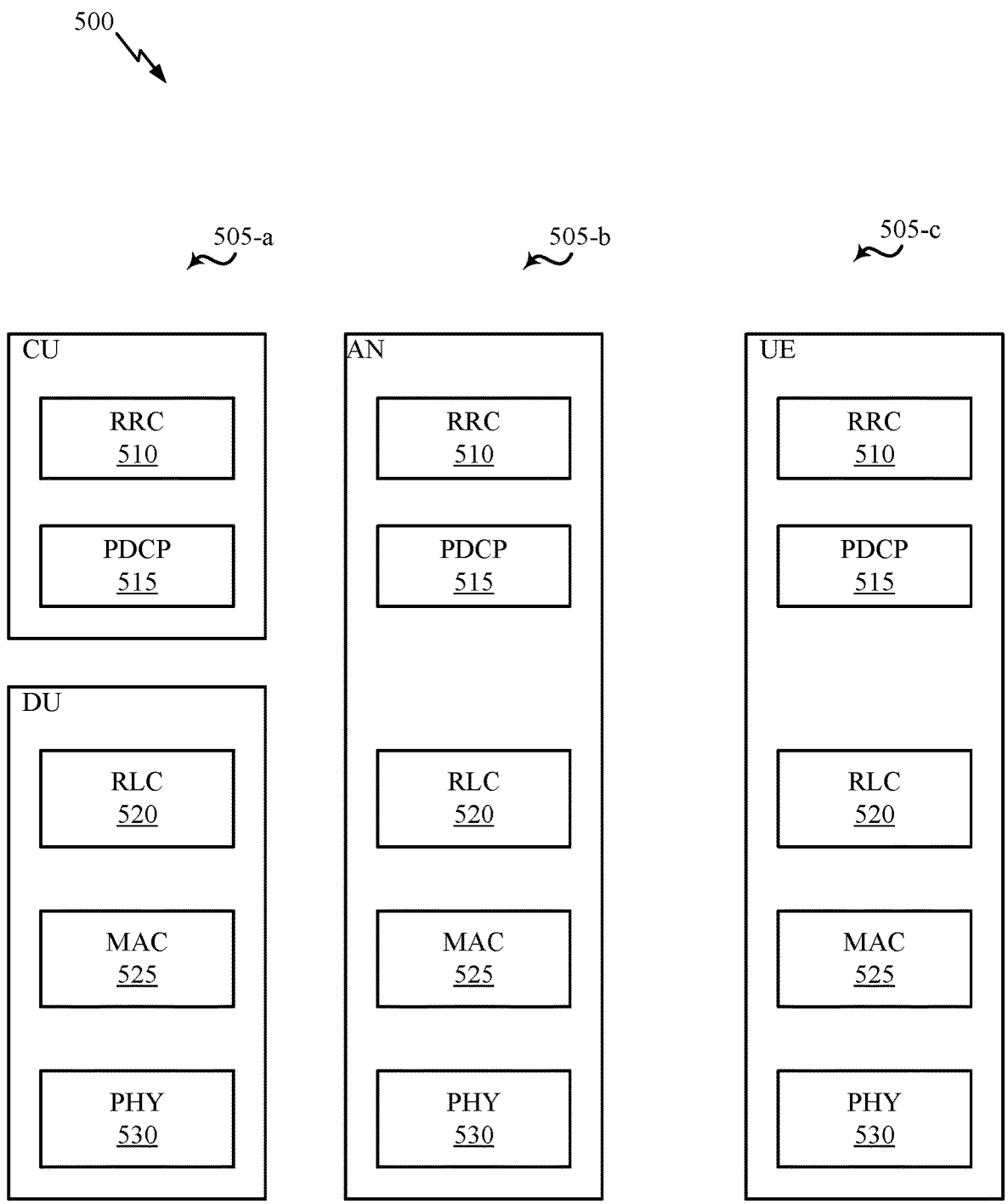
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
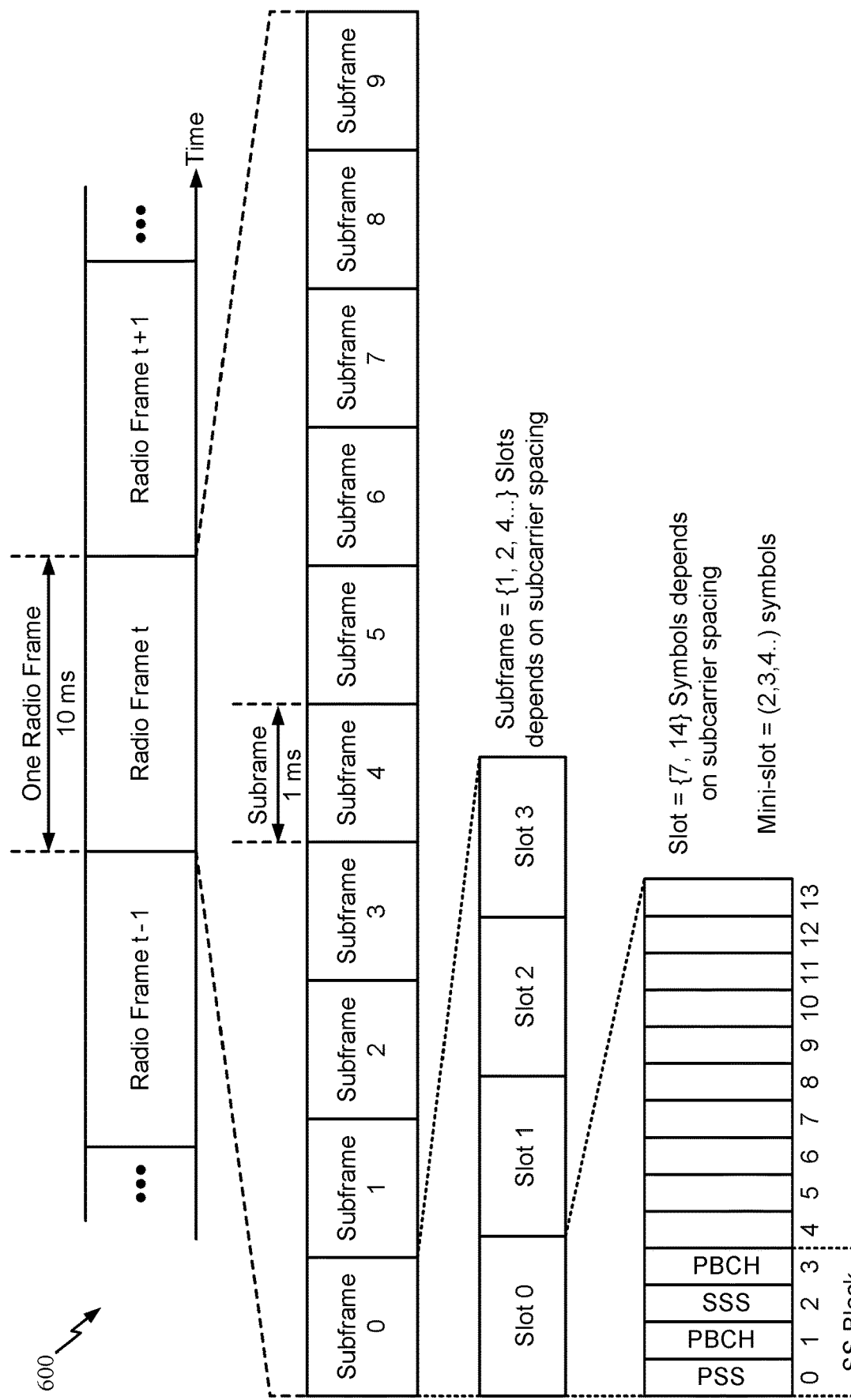
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Handover Criteria for Wireless Networks

In mobility scenarios when a user equipment (UE) is moving across multiple cells, handovers of the UE often take place between cells. An important step in handing over a UE from a source cell to a target cell is the measurement of neighbor cells by the UE and subsequent conveying of measurement reports to the network. The network decides on which neighbor cell is most suitable for the UE handover based on the measurement reports received from the UE. Current 3GPP specifications (e.g., LTE specification) define a set of measurement events. Each measurement event defines a measurement criterion that triggers reporting of the measurement event by a UE configured with the event, when the measurement criterion is satisfied. Table-1 shows a set of measurement events defined by current 3GPP standards.

TABLE 1

| Event Type | Description |
| --- | --- |
| Event A1 | Serving cell becomes better than a threshold |
| Event A2 | Serving cell becomes worse than a threshold |
| Event A3 | Neighbor cell becomes better than the serving cell by an offset |
| Event A4 | Neighbor cell becomes better than a threshold |
| Event A5 | Serving cell becomes worse than a threshold1 and neighbor cell becomes better than a threshold2 |
| Event B1 | Inter Radio Access Technology (RAT) neighbor cell becomes better than a threshold |

TABLE 1-continued

| Event Type | Description |
| --- | --- |
| Event B2 | Serving cell becomes worse than a threshold1 and inter RAT neighbor cell becomes better than a threshold2 |

Current 3GPP specifications define the measurement events based on signal strength parameters (e.g., Received Signal Received Power, RSRP, and/or Received Signal Received Quality, RSRQ etc.). For example, event A1 is triggered if a measured RSRP/RSRQ of the serving cell becomes higher than a threshold RSRP/RSRQ. Similarly, other measurement events are based on measured RSRP/RSRQ values of the serving and/or neighbor cell(s) depending on how the event is defined.

In current systems (e.g., LTE systems) the network generally configures a UE (e.g., via RRC signaling) for event based UE measurement reporting. The network uses an RRC connection reconfiguration message to configure a measurement object for the event based UE measurement reporting. The measurement object configures at least one measurement event that the UE is to report when a criterion defined for the configured measurement event is satisfied.

FIG. 7 illustrates an example measurement object 700 configuring the measurement event A5 for the UE. As shown in Table-1, the measurement event A5 is triggered when the serving cell RSRP/RSRQ becomes worse than a threshold1 value of RSRP/RSRQ and the neighbor cell becomes better than a threshold2 value of RSRP/RSRQ. As shown in FIG. 7, the measurement object 700 configures a value of 31 for threshold 1 RSRP (710 in FIG. 7) and configures a value of 37 for threshold 2 RSRP (720 in FIG. 7) for triggering the A5 measurement event reporting. Amongst other parameters, the measurement object 700 also configures a hysteresis value (730 in FIG. 7) of 2 for reporting the A5 event. In some cases, the measured RSRP value may fluctuate frequently due to measurement error by a UE modem and sometimes by the fluctuation of the radio channel itself. This may lead to many measurement reports being triggered, for example, when the measured RSRP value fluctuates around the trigger value. The hysteresis value ensures that a report is not triggered unless the measured value fluctuates wider than the configured hysteresis value.

In an aspect, the network configures the UE to measure one or more neighbor cells and to trigger a measurement report when the defined criterion for a configured measurement event (e.g., configured via a measurement object) is satisfied. In an aspect, the measurement report includes measured values (e.g., measured RSRP/RSRQ values) corresponding to one or more of the measured cells. For example, the UE configured with the measurement object 700, reports measured RSRP and/or RSRQ of one or more neighbor cells when the serving cell RSRP becomes lower than the configured RSRP value of 31 for threshold 1 and a neighbor cell RSRP becomes higher than the configured RSRP value of 37 for threshold 2. The network decides which of the reported neighbor cells are most optimal for the UE handover based on the UE measurement report. For example, the network may select a cell with the highest reported RSRP/RSRQ value to ensure a strong connection.

FIG. 8 illustrates an example UE measurement report 800. As shown, the measurement report 800 reports the measured RSRP and RSRQ values for each reported cell (e.g., identified by a physical cell ID in the report). For example, as shown in report 800, RSRP and RSRQ values 810, 820, and 830 are reported for three different cells. In an aspect, the UE may report either one of the RSRP or RSRQ values for each reported cell. In an aspect, the network configures which cells are to be reported and what parameters (e.g., RSRQ, RSRP, or both) are to be reported.

In current systems, the handover decision is only based on signal strength parameters (e.g., RSRP and/or RSRQ using which the network decides which neighbor cell is the most suitable for a UE handover). As noted above, the network configures a measurement object for a UE instructing the UE to measure one or more neighbor cells and trigger a reporting event when a certain RSRP/RSRQ criterion is satisfied. For example, the network provides a set of cell IDs and corresponding frequencies that the UE is to measure along with a set of thresholds (e.g., RSRP and/or RSRQ thresholds) which the UE continuously monitors and triggers a responsive configured event when a defined criterion for the event based on the thresholds is satisfied. The triggering of the configured event may include triggering a UE measurement report. The UE includes in the measurement report measured RSRP and/or RSRQ values corresponding to each reported cell. The network receives the measurement report from the UE and decides based on the measured RSRP/RSRQ of the reported cells an appropriate neighbor cell from the reported cells for the handover of the UE.

The signal strength based criterion for UE handover is suitable for a UE in an idle mode, for example, when the UE is only monitoring and receiving pages from the network and not actively receiving or transmitting data. However, the signal strength based handover criterion is not optimal for a UE in a connected state especially when performing data intensive operations including active data streams on the downlink and/or uplink. In some cases, even if a neighbor cell satisfies the signal strength criterion defined by the network, the neighbor cell may not be optimal for the UE handover. For example, the target cell may support a lower rank than the source cell, the target frequency on the target cell may support a lower rank than the source frequency of the source cell (e.g., due to device capability). Further, in intra-frequency handover, even when the frequency of the source and the target cell are the same, the rank in the target cell may be lower due to channel characteristics of the target cell. The lower rank in the target cell may affect the throughput of the UE. While this currently defined handover criteria may be sufficient for certain LTE systems, it is not suitable for 5G NR systems such as massive MIMO based systems.

Aspects of the present disclosure describe techniques for handover of UEs (especially in connected state) based at least on a rank based criterion. In an aspect, the rank based criterion may be in addition to or alternative to the current signal strength based criterion. The techniques described herein are applicable to 5G NR systems such as massive MIMO based systems both for 6 GHz and mmW mode. These techniques are also applicable to LTE systems.

Figure 9:
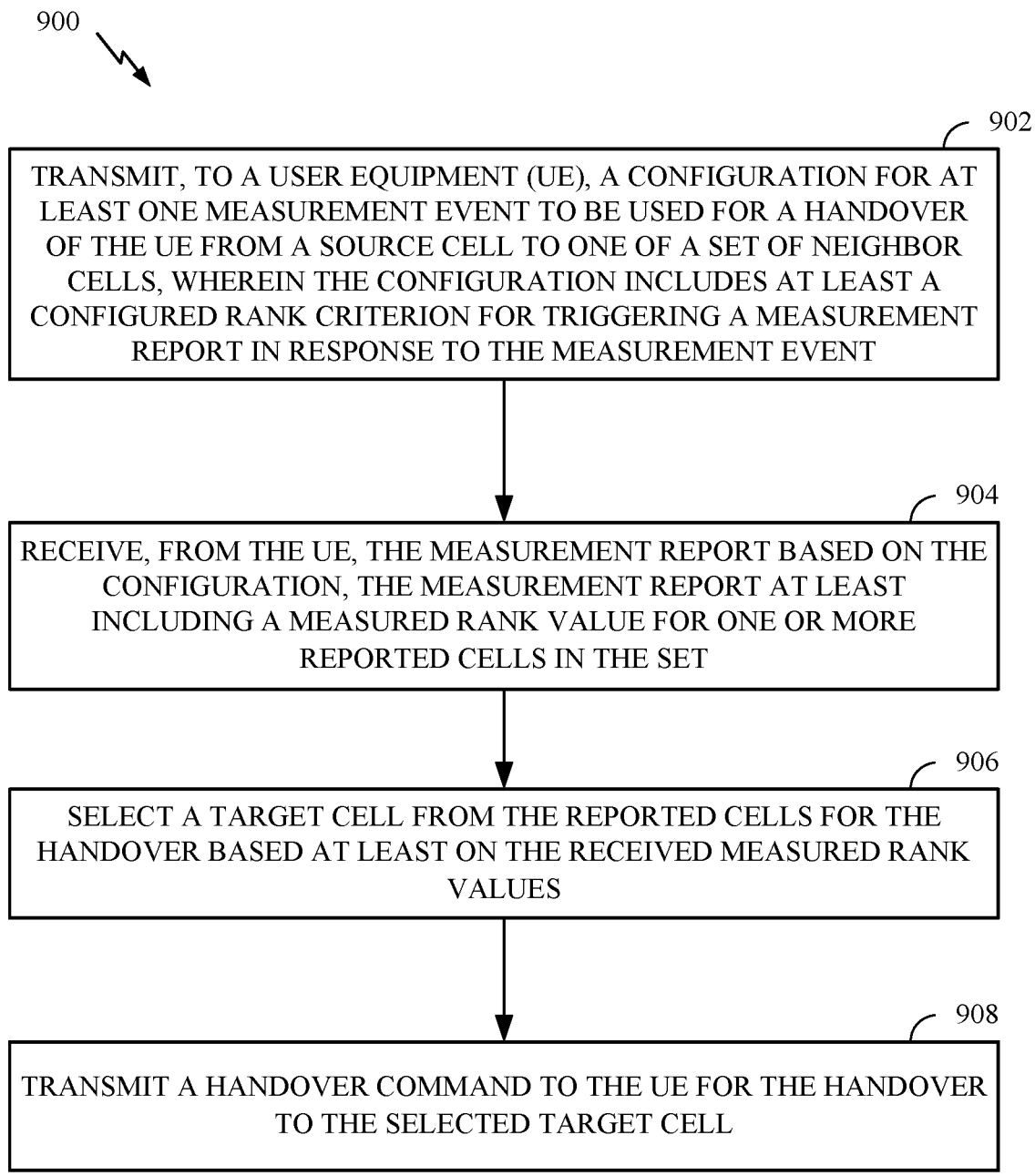
FIG. 9 illustrates example operations performed by a base station (BS) for UE handover based on a rank based criterion, in accordance with certain aspects of the present disclosure.

FIG. 9 illustrates example operations 900 performed by a base station (BS) (e.g., gNB or eNB) for UE handover based on a rank based criterion, in accordance with certain aspects of the present disclosure. Operations 900 begin, at 902, by transmitting, to a UE, a configuration for at least one measurement event to be used for a handover of the UE from a source cell to one of a set of neighbor cells, wherein the configuration includes at least a configured rank criterion for triggering a measurement report for the measurement event. At 904, the BS receives, from the UE, the measurement report based on the configuration, the measurement report at least including a measured rank value for one or more reported cells in the set. At 906, the BS selects a target cell from the reported cells for the handover based at least on the received measured rank values. At 908, the BS transmits a handover command to the UE for the handover to the selected target cell. In an aspect, the BS is a serving BS of the UE and the source cell is a serving cell. In an aspect, transmitting the configuration includes transmitting a measurement object (e.g., via RRC signaling) including the rank criterion.

Figure 10:
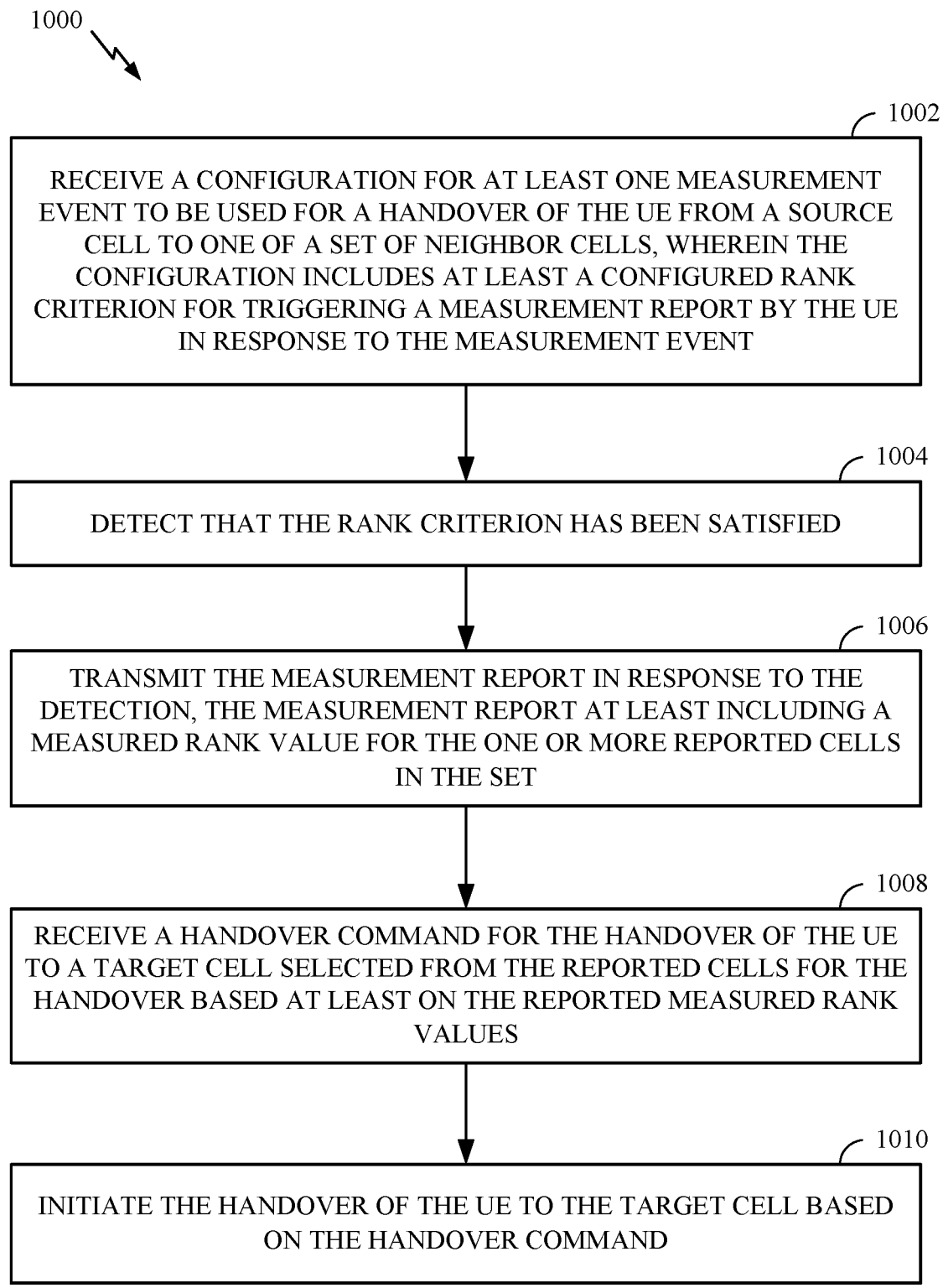
FIG. 10 illustrates example operations performed by a UE for a handover of the UE based on a rank based criterion, in accordance with certain aspects of the present disclosure.

FIG. 10 illustrates example operations 1000 performed by a UE for a handover of the UE based on a rank based criterion, in accordance with certain aspects of the present disclosure. Operations 1000 begin, at 1002, by receiving (e.g., from a serving BS) a configuration for at least one measurement event to be used for a handover of the UE from a serving cell to one of the set of neighbor cells, wherein the configuration includes at least a configured rank criterion for triggering a measurement report by the UE for the measurement event. At 1004, the UE detects that the rank criterion for the configured measurement event has been satisfied. At 1006, the UE transmits (e.g., to the serving BS) the measurement report in response to the detection, the measurement report at least including a measured rank value for one or more reported cells in the set. At 1008, the UE receives a handover command for the handover of the UE to a target cell selected from the reported cells for the handover based at least on the reported measured rank values. At 1010, the UE initiates the handover to the target cell based on the handover command. In an aspect, the source cell includes a serving cell of the UE. In an aspect, receiving the configuration includes receiving a measurement object (e.g., via RRC signaling) including the rank criterion.

It may be noted that the terms base station and cell may be interchangeably used throughout this disclosure.

In an aspect, the rank criterion includes a measured rank value of the serving cell becoming higher than a threshold rank value.

In an aspect, the rank criterion includes a measured rank value of the serving cell dropping lower than a threshold rank value.

In an aspect, the rank criterion includes a measured rank of a neighbor cell becoming better than the serving cell's measured rank by an offset.

In an aspect, the rank criterion includes a measured rank of the neighbor cell becoming higher than a threshold rank.

In an aspect, the UE is configured to measure the ranks of the neighboring cells based on the reference signals already configured for the cells.

In certain aspects, selecting a neighbor cell for the UE handover based on a rank based criterion helps maintain an acceptable throughput so that the user does not observe a significant degradation in data speeds.

In certain aspects, the rank based criterion may be used in combination with a signal strength based criterion for selecting a cell for handover of the UE. For example, the UE may be configured to measure a signal strength parameter (e.g., RSRP/RSRQ) in addition to the rank of neighbor cells, and to trigger measurement reports when both the signal strength based criterion and the rank based criterion are satisfied. In this case the measurement reports may include a measured signal strength value (e.g., RSRP/RSRQ) in addition to the measured rank for each reported cell. The UE is instructed to measure a rank parameter in addition to a signal strength parameter of the neighboring cells. A reporting event may be triggered when the configured rank criterion is satisfied in addition to the signal quality criterion. In an aspect, in order to trigger a reporting event, a neighboring cell must satisfy the rank criterion in addition to satisfying the signal strength criterion. In certain aspects, the rank based criterion may be added to the existing measurement events, or new measurement events may be defined that include both a rank criterion and a signal quality criterion. For example, new Information Elements (IEs) may be added to the existing measurement objects by adding a rank criterion for a configured event in addition to the existing signal quality criterion.

FIG. 11 illustrates an example measurement object 1100 adding a rank based criterion to the measurement object 700 of FIG. 7, in accordance with certain aspects of the present disclosure.

As shown, the measurement object 1100 includes additional information elements configuring a rank threshold (1110) and, in certain aspects, a rank hysteresis (1120) in addition to the RSRP thresholds for the event A5. As noted above, the UE measures RSRP and rank for each neighbor cell and triggers a report when both the RSRP and rank criteria are satisfied.

In certain aspects, a similar change may be made to the measurement reports where the UE upon satisfying a trigger condition for a configured event, in addition to reporting the RSRP/RSRQ of the neighbor cells, also reports the measured rank of the neighbor cell.

FIG. 12 illustrates an example measurement report 1200 adding measured rank reports to the measurement report 800 of FIG. 8, in accordance with certain aspects of the present disclosure. As shown, the measurement report 1200 reports a rank value for each reported cell in addition to reporting RSRP/RSRQ values for the cell. As shown, the report 1200 includes measured rank values 1210, 1220, and 1230 corresponding to the first, second and third reported cells.

The network decides an optimal cell for the UE handover based both on the reported rank values and the reported signal strength values. The network, based on the report including the measured RSRP/RSRQ and ranks of the reported neighbor cells, may make a better decision to determine the most optimal cell to handover the UE. For example, based on the measurement report 1200, if the network determines that both the cells with RSRPs of 19 and 20 may sufficiently maintain a reliable link, the network may prioritize the cell with the higher reported rank for the handover. Thus, this technique ensures that a target cell determined for handover of the UE, in addition to satisfying a signal strength criterion/threshold (e.g., good enough to maintain a reliable connection), also satisfies a rank criterion to maintain an acceptable throughput so that the user does not observe a significant degradation in data speeds. Thus, a target cell selected based on this technique is more optimal as compared to selecting a target cell based on only a signal strength criterion.

In alternative aspects, the UE may be configured to trigger a measurement report when either one of the signal strength based or the rank based criteria are satisfied. However, the UE may still report both signal strength and rank values for each reported cell, and the network may take into account signal strength and rank of the reported cells to select a target cell for the UE handover.

In certain aspects, rules may be defined for selecting a target cell for the UE handover based on the reported signal strength and rank values of the reported cells.

In an aspect, the network selects a target cell having a reported signal quality value higher than a configured threshold signal quality value and having the highest reported measured rank value. For example, if more than one reported cell satisfies the signal quality threshold the network selects a cell with the highest reported rank value.

In an aspect, the network assigns a configured weight to each reported rank value and each reported signal quality value, wherein a higher weight is assigned to a higher reported rank value and a higher reported signal quality value. For each reported cell, the assigned weights are added for a corresponding reported rank value and reported signal quality value. The network selects a reported cell having the highest added assigned weight as the target cell for the UE handover.

In certain aspects, the current measurement events/objects and measurement reports may be kept as is, and a new set of measurement events/objects and associated reports may be defined solely based on the rank parameter. Table-2 shows newly defined measurement events based solely on rank based criteria.

TABLE 2

| Event Type | Description |
| --- | --- |
| Event R1 | Serving cell's Rank becomes higher than threshold |
| Event R2 | Serving cell's Rank drops lower than the threshold |
| Event R3 | Neighbor cell's Rank becomes better than the serving cell's rank by an offset |
| Event R4 | Neighbor cell's Rank becomes better than a threshold |

The network may configure each UE with at least one of the new measurement events using a measurement object (e.g., via RRC configuration). The UE may report measured ranks of one or more neighbor cells when the rank criterion is satisfied. In this context, the UE may or may not report signal strength values for each reported cell. The network may select a target cell for the UE handover based only on the reported rank values of the reported cells. This technique may be helpful in dense BS deployments in which most cells generally provide acceptable signal quality and maintaining throughput across the cells is important.

In certain aspects, the above described techniques may be applied to secondary cell (SCell) additions as well. The network configures the UE to measure one or more cells and to trigger a measurement report when the rank criterion and/or signal quality criterion is satisfied for a configured measurement event (e.g., configured via a measurement object). In an aspect, the measurement report includes measured values (e.g., measured rank and/or measured RSRP/RSRQ values) corresponding to one or more of the measured cells. The network selects one of the reported neighbor cells based on the rules discussed above and adds the selected cell as a SCell (e.g., as a component carrier). This way the network may add a component carrier that is strong enough in terms of signal quality (e.g., above a signal quality threshold) as well as supporting a higher rank (e.g., above a configured threshold rank).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, by a Base Station (BS), comprising:
 transmitting, to a User Equipment (UE), a configuration for at least one measurement event to be used for a handover of the UE from a source cell to one of a set of neighbor cells, wherein:
  the configuration includes at least a configured threshold Multiple Input Multiple Output (MIMO) rank criterion associated with a throughput supported for communications between a cell and the UE,
  the threshold MIMO rank criterion comprises:
   a rank of the source cell becoming higher than the threshold, a rank of the source cell becoming lower than the threshold,
a rank of at least one of the set of neighbor cells exceeding a rank of the source cell by more than the threshold, and
a rank of at least one of the neighbor cells becoming higher than the threshold, and
measurement of a MIMO rank for at least one of the set of neighbor cells meeting or exceeding the configured threshold MIMO rank criterion triggers the UE to generate and transmit a measurement report in response to the at least one measurement event;
receiving, from the UE, the measurement report based on the configuration, the measurement report at least including a measured MIMO-rank value for one or more reported cells in the set, the one or more reported cells in the set comprising cells having measured MIMO-rank values exceeding the threshold MIMO rank criterion;
selecting a target cell from the one or more reported cells in the set for the handover based at least on the received measured MIMO-rank values and measured signal strengths for the one or more reported cells; and
transmitting a handover command to the UE for the handover to the selected target cell.

2. The method of claim 1, wherein the configuration further comprises a received signal quality criterion, wherein the measurement report is triggered if the configured MIMO-rank criterion and the received signal quality criterion are satisfied.

3. The method of claim 2, wherein the measurement report further comprises a measured received signal quality value for each of the one or more reported cells in the set.

4. The method of claim 3, wherein the selecting comprises selecting the target cell from the one or more reported cells in the set further based on the measured received signal quality value for each of the one or more reported cells in the set.

5. The method of claim 4, wherein the selecting the target cell comprises selecting a cell from the one or more reported cells in the set having a measured received signal quality value higher than a configured threshold signal quality value and having the highest reported measured MIMO-rank value.

6. The method of claim 4, wherein the selecting the target cell comprises:
assigning a configured weight to each reported MIMO-rank value and each measured received signal quality value, wherein a higher weight is assigned to a higher reported MIMO-rank value and a higher measured received signal quality value;
adding, for each of the one or more reported cells in the set, the assigned weights for a corresponding reported MIMO-rank value and reported signal quality value; and
selecting one of the one or more reported cells having the highest added assigned weight.

7. The method of claim 1, wherein the configured MIMO-rank criterion comprises the UE detecting a measured MIMO-rank value of the source cell is higher than a threshold MIMO-rank value, wherein the configuration includes the threshold MIMO-rank value.

8. The method of claim 1, wherein the configured MIMO-rank criterion comprises the UE detecting that a measured rank value of the source cell has dropped lower than a threshold rank value, wherein the configuration includes the threshold rank value.

9. The method of claim 1, wherein the configured MIMO-rank criterion comprises the UE detecting that a measured MIMO-rank value of at least one cell from the set of neighbor cells is higher than a measured MIMO-rank value of the source cell.

10. The method of claim 1, wherein the configured MIMO-rank criterion comprises the UE detecting that a measured MIMO-rank value of at least one cell from the set of neighbor cells is higher than a threshold MIMO-rank value, wherein the configuration includes the threshold MIMO-rank value.

11. The method of claim 1, further comprising adding the target cell as a secondary cell (SCell).

12. A method for wireless communication, by a User Equipment (UE), comprising:
receiving a configuration for at least one measurement event to be used for a handover of the UE from a source cell to one of a set of neighbor cells, wherein:
the configuration includes at least a configured threshold Multiple Input Multiple Output (MIMO) rank criterion associated with a throughput support for communications between a cell and the UE,
the threshold MIMO rank criterion comprises:
a rank of the source cell becoming higher than the threshold,
a rank of the source cell becoming lower than the threshold,
a rank of at least one of the set of neighbor cells exceeding a rank of the source cell by more than the threshold, and
a rank of at least one of the neighbor cells becoming higher than the threshold, and
measurement of a MIMO rank for at least one of the set of neighbor cells meeting or exceeding the configured threshold MIMO rank criterion triggers the UE to generate and transmit a measurement report by the UE in response to the at least one measurement event;
determining that the configured MIMO-rank criterion has been satisfied;
transmitting the measurement report in response to determining that the configured MIMO-rank criterion has been satisfied, the measurement report at least including a measured MIMO-rank value for one or more reported cells in the set, the one or more reported cells in the set comprising cells having measured MIMO-rank values exceeding the threshold MIMO rank criterion;
receiving a handover command for the handover of the UE to a target cell selected from the one or more reported cells in the set for the handover based at least on the reported measured MIMO-rank value for the one or more reported cells in the set and measured signal strengths for the one or more reported cells; and
initiating the handover of the UE to the target cell based on the handover command.

13. The method of claim 12, wherein the configuration further comprises a received signal quality criterion, wherein the measurement report is triggered at the UE if the configured MIMO-rank criterion and the received signal quality criterion are satisfied.

14. The method of claim 13, further comprising:
detecting that the received signal quality criterion is satisfied, wherein the transmitting the measurement report is further in response to detecting that the received signal quality criterion is satisfied.

15. The method of claim 13, wherein the measurement report further comprises a measured received signal quality value for each of the one or more reported cells in the set.

16. The method of claim 15, wherein the target cell is selected from the one or more reported cells in the set further based on the measured received signal quality value for each of the one or more reported cells in the set.

17. The method of claim 16, wherein the target cell has a measured received signal quality value higher than a configured threshold signal quality value and has the highest reported measured MIMO-rank value.

18. The method of claim 16, wherein the target cell has the highest combined weight assigned to a corresponding reported MIMO-rank value and reported signal quality value.

19. The method of claim 12, wherein the detecting comprises detecting a measured MIMO-rank value of the source cell is higher than a threshold MIMO-rank value, wherein the configuration includes the threshold MIMO-rank value.

20. The method of claim 12, wherein the detecting comprises detecting that a measured MIMO-rank value of the source cell has dropped lower than a threshold MIMO-rank value, wherein the configuration includes the threshold MIMO-rank value.

21. The method of claim 12, wherein the detecting comprises detecting that a measured MIMO-rank value of at least one cell from the set of neighbor cells is higher than a measured MIMO-rank value of the source cell.

22. The method of claim 12, wherein the detecting comprises detecting that a measured MIMO-rank value of at least one cell from the set of neighbor cells is higher than a threshold MIMO-rank value, wherein the configuration includes the threshold MIMO-rank value.

23. An apparatus for wireless communication, by a Base Station (BS), comprising:
   means for transmitting, to a User Equipment (UE), a configuration for at least one measurement event to be used for a handover of the UE from a source cell to one of a set of neighbor cells, wherein:
      the configuration includes at least a configured threshold Multiple Input Multiple Output (MIMO) rank criterion associated with a throughput supported for communications between a cell and the UE,
      the threshold MIMO rank criterion comprises:
         a rank of the source cell becoming higher than the threshold,
         a rank of the source cell becoming lower than the threshold,
         a rank of at least one of the set of neighbor cells exceeding a rank of the source cell by more than the threshold, and
         a rank of at least one of the neighbor cells becoming higher than the threshold, and
      measurement of a MIMO rank for at least one of the set of neighbor cells meeting or exceeding the configured threshold MIMO rank criterion triggers the UE to generate and transmit a measurement report in response to the at least one measurement event;
   means for receiving, from the UE, the measurement report based on the configuration, the measurement report at least including a measured MIMO-rank value for one or more reported cells in the set, the one or more reported cells in the set comprising cells having measured MIMO-rank values exceeding the threshold MIMO rank criterion;
   means for selecting a target cell from the one or more reported cells in the set for the handover based at least on the received measured MIMO-rank values and measured signal strengths for the one or more reported cells; and
   means for transmitting a handover command to the UE for the handover to the selected target cell.

24. The apparatus of claim 23, wherein the configuration further comprises a received signal quality criterion, wherein the measurement report is triggered if the configured MIMO-rank criterion and the received signal quality criterion are satisfied.

25. The apparatus of claim 24, wherein the measurement report further comprises a measured received signal quality value for each of the one or more reported cells in the set.

26. The apparatus of claim 25, wherein the means for selecting selects the target cell from the one or more reported cells in the set further based on the measured received signal quality value for each of the one or more reported cells in the set.

27. The apparatus of claim 26, wherein the means for selecting the target cell selects a cell from the one or more reported cells in the set having a measured received signal quality value higher than a configured threshold signal quality value and having the highest reported measured MIMO-rank value.

28. An apparatus for wireless communication, by a User Equipment (UE), comprising:
   means for receiving a configuration for at least one measurement event to be used for a handover of the UE from a source cell to one of a set of neighbor cells, wherein:
      the configuration includes at least a configured threshold Multiple Input Multiple Output (MIMO) rank criterion associated with a throughput support for communications between a cell and the UE,
      the threshold MIMO rank criterion comprises:
         a rank of the source cell becoming higher than the threshold,
         a rank of the source cell becoming lower than the threshold,
         a rank of at least one of the set of neighbor cells exceeding a rank of the source cell by more than the threshold, and
         a rank of at least one of the neighbor cells becoming higher than the threshold, and
      measurement of a MIMO rank for at least one of the set of neighbor cells meeting or exceeding the configured threshold MIMO rank criterion triggers the UE to generate and transmit a measurement report by the UE in response to the at least one measurement event;
   means for determining that the configured MIMO-rank criterion has been satisfied;
   means for transmitting the measurement report in response to determining that the configured MIMO-rank criterion has been satisfied, the measurement report at least including a measured MIMO-rank value for one or more reported cells in the set, the one or more reported cells in the set comprising cells having measured MIMO-rank values exceeding the threshold MIMO rank criterion;
   means for receiving a handover command for the handover of the UE to a target cell selected from the one or more reported cells in the set for the handover based at least on the reported measured MIMO-rank value for the one or more reported cells in the set and measured signal strengths for the one or more reported cells; and means for initiating the handover of the UE to the target cell based on the handover command.

29. The apparatus of claim 28, wherein the configuration further comprises a received signal quality criterion, wherein the measurement report is triggered at the UE if the configured MIMO-rank criterion and the received signal quality criterion are satisfied.

30. The apparatus of claim 29, further comprising:
means for detecting that the received signal quality criterion is satisfied, wherein the transmitting the measurement report is further in response to detecting that the received signal quality criterion is satisfied.

* * * * *